(12) United States Patent
Levin et al.

(10) Patent No.: US 7,519,818 B2
(45) Date of Patent: Apr. 14, 2009

(54) METHOD AND SYSTEM FOR PROCESSING A COMMUNICATION BASED ON TRUST THAT THE COMMUNICATION IS NOT UNWANTED AS ASSIGNED BY A SENDING DOMAIN

(75) Inventors: Orit Levin, Redmond, WA (US); Sean C. Olson, Duvall, WA (US); Timothy Rang, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 744 days.

(21) Appl. No.: 11/008,639

(22) Filed: Dec. 9, 2004

(65) Prior Publication Data

US 2006/0168022 A1 Jul. 27, 2006

(51) Int. Cl.
*H04L 1/00* (2006.01)
(52) U.S. Cl. .......................... 713/170; 713/168; 726/22
(58) Field of Classification Search ........................ None
See application file for complete search history.

(56) References Cited

U.S. PATENT DOCUMENTS

| | | | |
|---|---|---|---|
| 6,161,130 A * | 12/2000 | Horvitz et al. | ............... 709/206 |
| 7,124,123 B1 | 10/2006 | Roskind et al. | |
| 7,213,260 B2 | 5/2007 | Judge | |
| 2004/0203589 A1 | 10/2004 | Wang et al. | |
| 2005/0080857 A1 * | 4/2005 | Kirsch et al. | ................ 709/206 |

OTHER PUBLICATIONS

U.S. Appl. No. 11/008,083, filed Dec. 9, 2004, Levin et al.
U.S. Appl. No. 11/008,636, filed Dec. 9, 2004, Levin et al.
Levin, O., A. Houri and E. Aoki, "Inter-domain Requirements for SIMPLE." SIMPLE WG, Internet-Draft, The Internet Society, Jul. 18, 2004, 19 pages.

* cited by examiner

*Primary Examiner*—Kimyen Vu
*Assistant Examiner*—Ponnoreay Pich
(74) *Attorney, Agent, or Firm*—Perkins Coie LLP (57) ABSTRACT

A method and system for identifying whether an electronic communication is likely to be unwanted by the recipient is provided. A trust system relies on a trust provider, such as a sending domain, to indicate whether an electronic communication is likely to be unwanted. The sending domain may assign its trust level to the electronic communications based on various factors. Upon receiving the electronic communication and the trust level assigned by the sending domain, the receiving domain may determine whether to forward the electronic communication to the recipient based on the trust level. If a sending domain consistently provides trust levels that are accurate assessments of whether electronic communications are unwanted, then the receiving domain learns to trust the trust levels assigned by the sending domain. In contrast, if the assigned trust levels are not accurate, then the receiving domain learns not to trust the sending domain and may discard all message from the receiving domain without forwarding them to the recipients.

18 Claims, 7 Drawing Sheets

METHOD AND SYSTEM FOR PROCESSING A COMMUNICATION BASED ON TRUST THAT THE COMMUNICATION IS NOT UNWANTED AS ASSIGNED BY A SENDING DOMAIN

TECHNICAL FIELD

The described technology relates generally to determining whether an electronic communication, such as an instant messaging request or an electronic mail message, may be unwanted.

BACKGROUND

Electronic communications, such as electronic mail messages and instant messages, are increasingly being used for both business and personal uses. Electronic communications have many advantages over nonelectronic communications, such as postal mail. These advantages include low cost, rapid delivery, ease of storage, and so on. Because of these advantages, electronic communications have resulted in many benefits including increased worker productivity, more informed decision making, and so on. These benefits, however, are currently being limited because of the vast number of unwanted electronic communications, also known as "junk mail" or "spam," that are being sent via the Internet.

Because of the advantages of low cost and rapid delivery, many organizations use electronic communications to advertise by sending electronic communications that most recipients do not want to receive. For example, a mortgage company may purchase a list of electronic mail addresses and send an electronic mail message containing an advertisement for the mortgage company to each electronic mail address. Since the cost of sending each electronic mail message is extremely small, an organization can cost effectively send thousands and even millions of electronic mail messages containing their advertisements. Even if only a small fraction of a percent of the recipients respond to the advertisement, the benefits to the organization may outweigh the small cost of sending the electronic mail messages.

Because many organizations send advertisements via electronic mail messages, it is not uncommon for a person to receive many unwanted electronic mail messages a day. People receiving such unwanted electronic mail messages typically find them annoying. Indeed, their productivity can decrease significantly as they separate the unwanted from the wanted electronic mail messages. Unwanted electronic mail messages may also cause a person's inbox to become full and may make it difficult to locate and identify wanted electronic mail messages.

Various techniques have been developed to combat unwanted electronic mail messages. For example, some electronic mail systems allow a user to create a black list of unwanted electronic mail senders. When an electronic mail message is received from a sender on the black list, the electronic mail system may automatically discard the unwanted electronic mail message or may automatically store the unwanted electronic mail message in a special folder. When an unwanted mail message is received from a sender who is not currently on the black list, the recipient can indicate to add that sender to the black list. As another example, some electronic mail systems may allow the recipient to specify a white list of allowed senders. If an electronic mail message is received from a sender who is not on the white list, then the electronic mail system may automatically discard or otherwise specially handle such an electronic mail message.

Instant messaging systems also have problems with unwanted instant message requests that, in some respects, could be more problematic than the problems associated with unwanted electronic mail. In particular, because instant messaging to be effective requires that a person's attention will be directed to an instant message as it is received, when an unwanted instant message request is received, that person's attention is unnecessarily distracted by an unwanted instant message request. The unwanted instant message request may be a request to obtain presence information of the recipient, to invite the recipient to join in an instant messaging session with the sender of the request, and so on. Since electronic mail systems do not require such attention of the recipient, unwanted messages can present more problems to instant messaging systems than to electronic mail systems.

The problems resulting from unwanted instant message requests have not been particularly significant because instant messaging systems have traditionally been restricted to a single domain. Such instant messaging systems could prohibit instant message requests from outside the domain and could control unwanted instant message requests from originating within the domain. For example, if the domain comprises the computer systems of a company, then the management of the company could take action against an employee who sends unwanted instant message requests.

It is anticipated, however, that inter-domain instant messaging will increase. As a result, instant messaging users will likely receive unwanted instant message requests from outside their domain. It would be desirable to have a way to identify whether communications, such as instant message requests and electronic mail messages, sent from other domains are likely to be unwanted by the recipient.

SUMMARY

A method and system for identifying whether an electronic communication is likely to be unwanted by the recipient is provided. A trust system relies on a trust provider, such as a sending domain, to assign a trust level indicating whether an electronic communication is likely to be unwanted. The sending domain may base its trust level on various factors including the history of electronic communications sent by that sender. Upon receiving the electronic communication and the trust level assigned by the sending domain, the receiving domain may determine whether to forward the electronic communication to the recipient based on the trust level. If a sending domain consistently assigns trust levels that are accurate assessments of whether its electronic communications are unwanted, then the receiving domain learns to trust the trust levels assigned by the sending domain. In contrast, if the assigned trust levels are not accurate, then the receiving domain learns not to trust the sending domain and may discard all messages from the sending domain without forwarding them to the recipients.

DETAILED DESCRIPTION

A method and system for identifying whether an electronic communication is likely to be unwanted by the recipient is provided. In one embodiment, a trust system relies on a trust provider, such as a sending domain, to indicate whether an electronic communication is likely to be unwanted. For example, whenever an electronic communication is sent from one domain to another domain, the sending domain may assign a level of trust it has that the electronic communication will not be unwanted by the recipient. The sending domain may base its trust level on various factors including the history of electronic communications sent by that sender. Upon receiving the electronic communication and the trust level assigned by the sending domain, the receiving domain may determine whether to forward the electronic communication to the recipient based on whether a trust criterion is satisfied. The trust criterion may be satisfied when the trust level is above a threshold trust level, when the sending domain is on a list of domains whose electronic communications are allowed, and so on. A receiving domain may calculate the confidence it has in the trust levels assigned by a sending domain and factor in that confidence when determining whether to forward electronic communications to recipients within the receiving domain. For example, if the receiving domain determines that the trust levels assigned by a sending domain accurately reflect whether electronic communications from the sending domain are unwanted or not, then the receiving domain may have high confidence in the sending domain. If a sending domain, however, consistently assigns trust levels that are not accurate assessments of whether electronic communications are unwanted, then the receiving domain may block some or all of the electronic communications from that sending domain. Thus, sending domains have an incentive to assign trust levels to messages or senders that accurately reflect whether electronic communications that originate from their domains are unwanted ("real trust level"). If receiving domains do not have confidence in the trust levels of a sending domain, the receiving domains may block all (or some portion of) electronic communications from that sending domain. In this way, sending domains will need to develop ways to accurately assess trust levels for electronic communications originating in their domains and provide those accurate assessments of trust level to the receiving domains to prevent their electronic communications from being blocked.

In one embodiment, a sending domain determines the trust level that it has that an electronic communication is not unwanted based on various factors, such as historical sending patterns of the sender, feedback from receiving domains, identity of the sender, fees charged to the sender, and so on. One factor based on historical sending patterns that may indicate a sender may not be trusted is when the sender sends hundreds of electronic messages in a short period of time. The receiving domain may provide feedback to the sending domain as to whether a sender within the sending domain is sending unwanted communications. The recipients at the receiving domain may manually indicate when electronic communications are unwanted. In such a case, the receiving domain may notify the sending domain. The sending domain can then factor that information into its analysis of the trust level of the sender. In addition, some sending domains may not know the actual identities of the senders. For example, the sending domain may provide a free service to which anyone can subscribe without providing any identification information. In such a case, the sending domain may reduce the trust level it has in such subscribers.

In one embodiment, the trust level assigned by a sending domain may range from a low trust level to a high trust level. For example, the trust level may range from 0 to 100, with 0 indicating that the sending domain does not know whether the electronic communication is unwanted and with 100 indicating that the sending domain trusts that the electronic communication is not unwanted. Alternatively, the trust level may range from −100 to +100, with a trust level of −100 indicating that the sending domain has complete trust that the electronic communication is unwanted, with 0 indicating that the sending domain does not know whether the electronic communication is unwanted or wanted, and with +100 indicating that the sending domain has complete trust that the electronic communication is not unwanted.

In one embodiment, a receiving domain uses the trust levels provided by the sending domain (or an independent trust provider) to determine whether electronic communications should be forwarded to the recipients or discarded. The receiving domain forwards an electronic communication when a trust criterion is satisfied. The trust criterion may specify a condition in which an electronic communication with a trust level below a threshold trust level will not be forwarded to the recipient. The trust criterion may be based on a combination of various conditions. The trust criterion may also use a normalization factor that is specific to a sending domain. For example, one sending domain may assign a trust level of 75 on a scale of 0-100 for all its electronic communications, and a second sending domain may assign a trust level of 100 for all its electronic communications. If all the electronic communications of both sending domains, however, are indeed wanted, then the receiving domain may assign a normalization factor of 1.33 to the first sending domain and a normalization factor of 1.00 to the second sending domain. The receiving domain may multiply the trust levels of a sending domain by its corresponding normalization factor so that it has a trust level that is normalized across sending domains. In this example, the trust levels assigned by each sending domain will have a normalized trust level of 100 (e.g., 1.33*75).

In one embodiment, a receiving domain may calculate a confidence level that reflects the accuracy of the trust levels assigned by a sending domain. A receiving domain may start out with a confidence level of 1.00 in each sending domain. Whenever a sending domain sends an electronic message that is unwanted and the trust level assigned by the sending domain is high, then the receiving domain may decrease its confidence level in that sending domain. A receiving domain may block all communications from sending domains whose confidence level falls below a threshold confidence level. The receiving domain may also maintain a block list of sending domains whose electronic communications are not to be forwarded to its recipients, irrespective of the trust level assigned by the sending domain. The receiving domain may also maintain an allow list of sending domains whose electronic communications are to be forwarded to its recipients irrespective of the trust level assigned by the sending domain. An administrator at the receiving domain may maintain these lists. A receiving domain may also have a separate threshold trust level for each sending domain.

In one embodiment, a receiving domain may also provide the trust level to the recipient so that the recipient can determine how to process the electronic communication. For example, the trust level may be displayed to the recipient along with the identification of the sender and the sending domain. The recipient can then determine whether the electronic communication is unwanted. Whenever the recipient determines that an electronic communication is unwanted, the recipient may notify the trust system of its domain so that the trust system can adjust how it handles electronic communications from the sending domain as appropriate. The recipient's computer system may apply rules that indicate how to process the messages automatically based on trust level, sending domain, or sender. For example, one rule may specify to discard all messages below a certain trust level and another rule may indicate to allow all messages from a certain sender regardless of trust level. The trust system may be implemented at a central access point of a receiving domain or may be distributed to each client computer system within a receiving domain.

Figure 1:
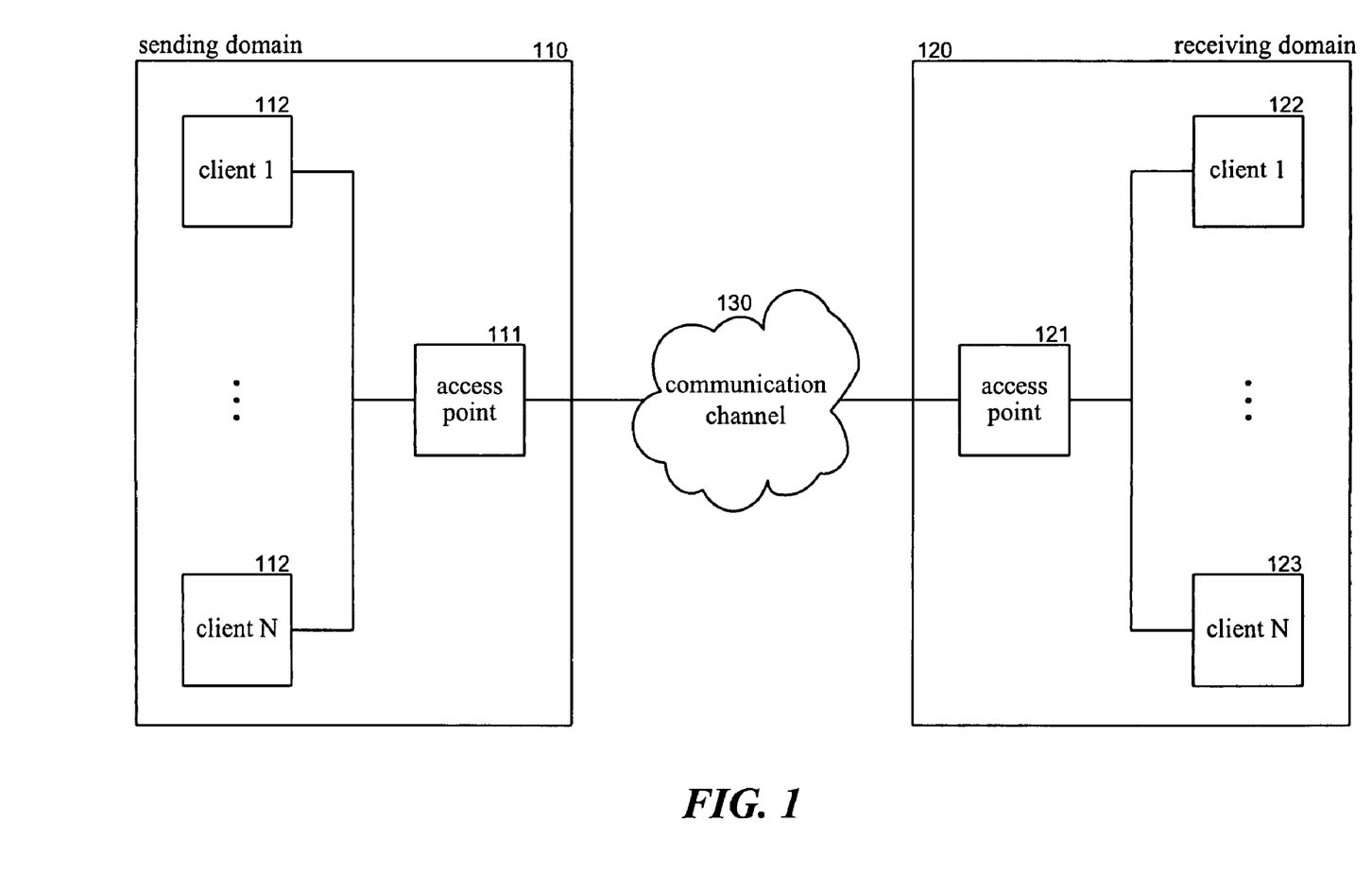
FIG. 1 is a block diagram that illustrates computer systems that use the trust system in one embodiment.

FIG. 1 is a block diagram that illustrates computer systems that use the trust system in one embodiment. A sending domain 110 and a receiving domain 120 are connected via communication channel 130. The sending domain includes access point 111 and client computer systems 112, and the receiving domain includes access point 121 and client computer systems 122. All inter-domain electronic communications are sent from and received by the access points of the domains. The access point of the sending domain may include components of the trust system that identify the trust level of an electronic communication. The access point of the sending domain may maintain a database of attributes of the electronic communications sent by each sender within that domain. The access point uses those attributes to determine the trust level of electronic communications sent by the senders within the sending domain. The access point of a receiving domain may include components of the trust system for determining whether the trust criterion is satisfied for an electronic communication and for forwarding the electronic communication to the recipient when the trust criterion is satisfied. The access point of the receiving domain may determine whether the trust level assigned by the sending domain exceeds a threshold trust level and, if so, forwards the electronic communication to the recipient. If not, the access point of the receiving domain may discard the electronic communication assuming that it is unwanted.

Figure 2:
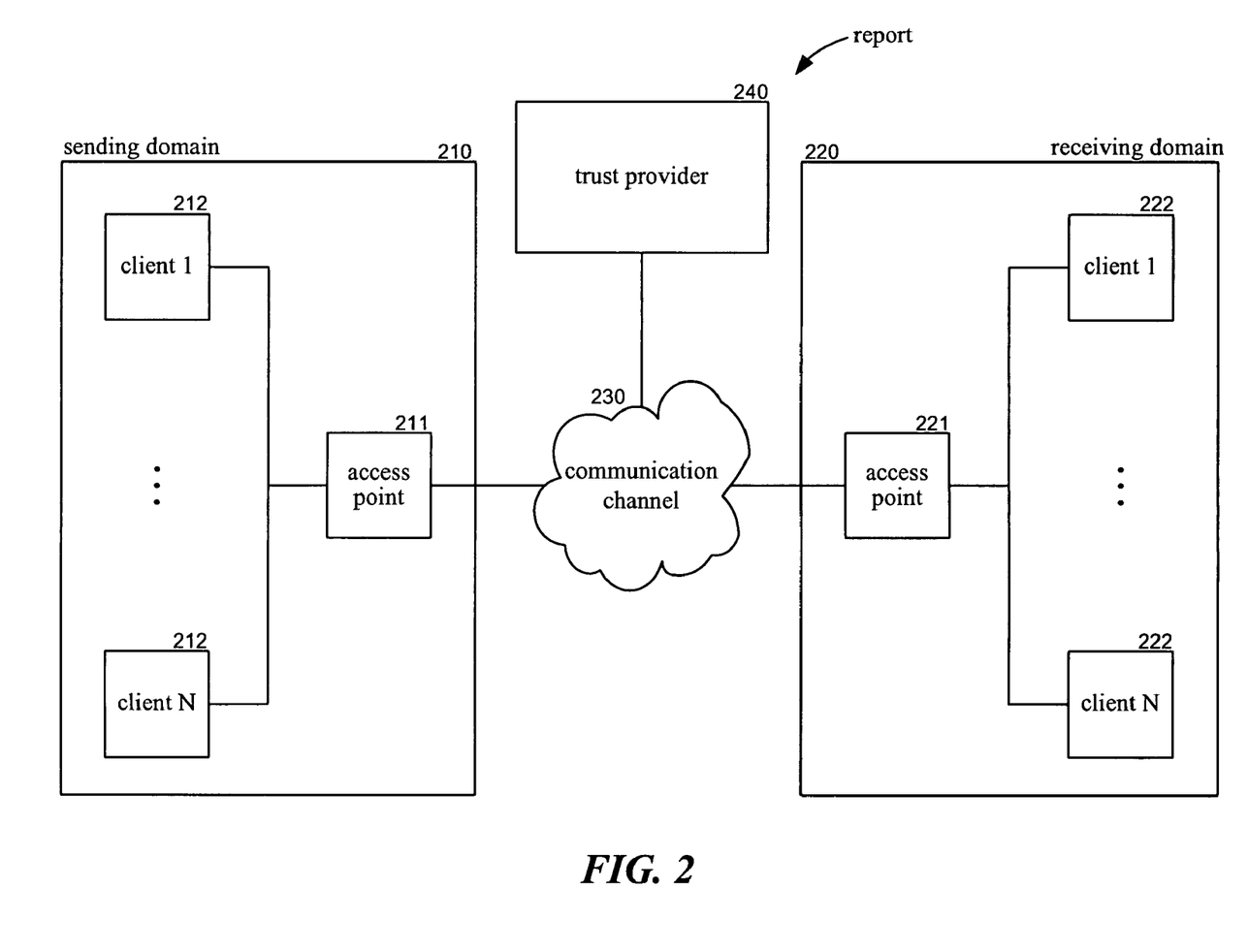
FIG. 2 is a block diagram that illustrates computer systems that use the trust system with an independent trust provider in one embodiment.

FIG. 2 is a block diagram that illustrates computer systems that use the trust system with an independent trust provider in one embodiment. A sending domain 210, a receiving domain 220, and a trust provider 240 are connected via communication channel 230. The sending domain includes access point 211 and client computer systems 212, and the receiving domain includes access point 221 and client computer systems 222. All inter-domain electronic communications are sent from and received by the access points of the domains. In this embodiment, the trust system of the receiving domain may, however, not rely on the trust level assigned by the sending domain. Rather, the receiving domain may request a trust level from the independent trust provider. The independent trust provider may collect information from receiving domains indicating their confidence in the trust levels assigned by various sending domains or indicating their trust in individual senders. The trust provider then generates an overall confidence level in the various sending domains and/or generates independent trust levels for various senders. Thus, the independent trust provider effectively rates the accuracy of the trust level provided by a sending domain or provides a trust level for each sender. Upon receiving an electronic communication, the access point of a receiving domain may request an independent trust provider to provide the confidence level for the sending domain and/or trust level for the sender. The independent trust provider may assign a trust level to the electronic communication. The access point of the receiving domain can then determine how to process the electronic communication based on the confidence level and/or trust level provided by the independent trust provider.

The principles of the trust system may also be used in environments where a service provider operates as a clearinghouse for electronic communications. The sending domains may send their electronic communications to a clearinghouse service provider domain, rather than directly to the receiving domain. The service provider can assess the trust level assigned by the sending domain to the received electronic communication and take appropriate action (e.g., discard or forward to receiving domain) in much the same way as would a receiving domain. Since the service provider may have visibility to electronic communications sent to multiple receiving domains, it may be able to make a more accurate assessment of the trust level of an electronic communication or sender or of the confidence in the accuracy of the trust levels assigned by a sending domain. When a receiving domain receives an electronic communication from the service provider, it can assess the confidence it has in the service provider and/or the sending domain and process the electronic communication accordingly. The principles of the trust system may be applied transitively to any number of clearinghouse service providers through which an electronic communication is sent. The trust level provided to the receiving domain may be the trust levels assigned by the sending domain and each clearinghouse service provider or an aggregate of those trust levels.

Figure 3:
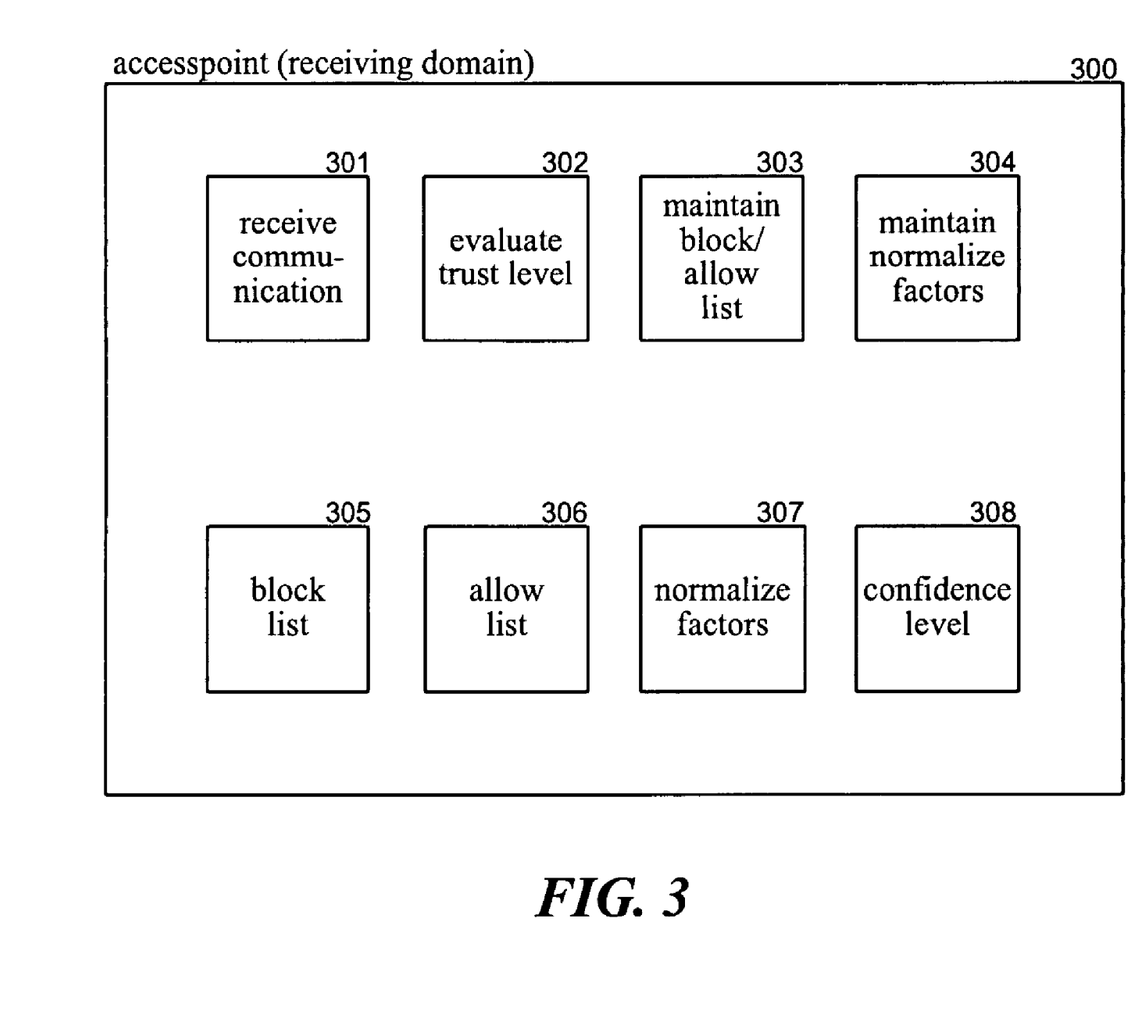
FIG. 3 is a block diagram that illustrates components of the trust system at an access point of a receiving domain in one embodiment.

FIG. 3 is a block diagram that illustrates components of the trust system at an access point of a receiving domain in one embodiment. A trust system 300 at a receiving domain includes a receive communication component 301, an evaluate trust level component 302, a maintain block/allow list component 303, and a maintain normalize factors component 304. The trust system may also include a block list store 305, an allow list store 306, a normalize factors store 307, and a confidence level store 308. Each received electronic communication is passed to the receive communication component. The receive communication component evaluates the trust level associated with the electronic communication by invoking the evaluate trust level component. The trust system then discards or forwards the electronic communication based on the evaluation. The trust system at the receiving domain also invokes the maintain block/allow list component to identify sending domains whose electronic communications should be blocked or allowed. The trust system may provide a user interface through which an administrator can maintain the list or may automatically maintain the list based on evaluation of the performance of sending domains. The maintain normalize factors component maintains normalization factors for the sending domains so that the trust levels from different sending domains can be normalized. The block list store identifies those sending domains whose electronic communications should be discarded irrespective of the trust levels. The allow list store identifies those sending domains whose electronic communications should be forwarded to the recipients irrespective of the trust level. Alternatively, communications from sending domains on the block list may only be blocked when their trust level is below a certain threshold trust level and on the allow list may only be allowed when their trust level is above a certain threshold trust level. One skilled in the art will appreciate that different threshold trust levels may be applied to different sending domains. The normalize factors store contains a normalization factor for each sending domain. The confidence level store contains an indication of the confidence in the accuracy of the trust levels assigned by each sending domain. The trust system may update the confidence level of a sending domain based on analysis of electronic communications received from that domain or may receive the confidence levels from an independent trust provider.

The computing device on which the trust system is implemented may include a central processing unit, memory, input devices (e.g., keyboard and pointing devices), output devices (e.g., display devices), and storage devices (e.g., disk drives). The memory and storage devices are computer-readable media that may contain instructions that implement the trust system. In addition, data structures and message structures may be stored or transmitted via a data transmission medium, such as a signal on a communication channel. Various communication channels may be used, such as the Internet, a local area network, a wide area network, or a point-to-point dial-up connection.

The trust system may be implemented in various operating environments including personal computers, server computers, hand-held or laptop devices, set-top boxes, recording devices, routers, switches, multiprocessor systems, microprocessor-based systems, programmable consumer electronics, network PCs, minicomputers, mainframe computers, distributed computing environments that include any of the above systems or devices, and the like.

The trust system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the functions of the trust system may be performed by access points of a domain or client computer systems within a domain or distributed between the access points and the client computer systems of a domain. In addition, various portions of the trust system may be provided by independent service providers. For example, a sending domain may rely, wholly or in part, on the trust level provided by an independent trust provider to establish the trust level for senders within the sending domain.

Figure 4:
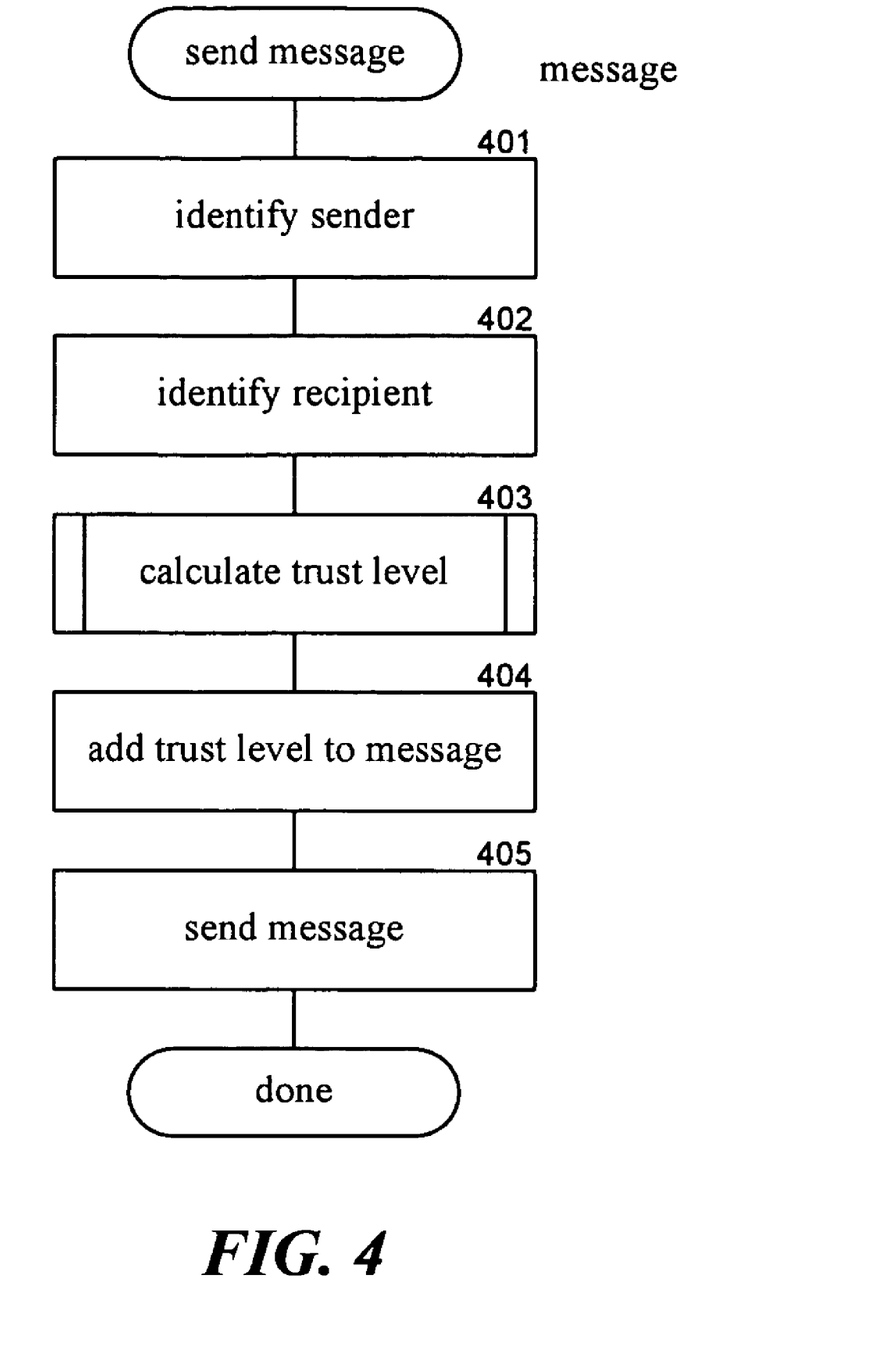
FIG. 4 is a flow diagram that illustrates the processing of a send electronic message component of an access point of a sending domain in one embodiment.

FIG. 4 is a flow diagram that illustrates the processing of a send electronic message component of an access point of a sending domain in one embodiment. The electronic message may be an electronic mail message sent to a user of a receiving domain, a request to obtain presence information of a user of the receiving domain or to invite a user of the receiving domain to participate in an instant messaging session, or another form of electronic communication. In block 401, the component identifies the sender of the message. In block 402, the component identifies the recipient of the message. In block 403, the component invokes the calculate trust level component and assigns a trust level that the message will not be unwanted by the recipient. In block 404, the component adds the assigned trust level to the message. In block 405, the component sends the message to the receiving domain and then completes.

Figure 5:
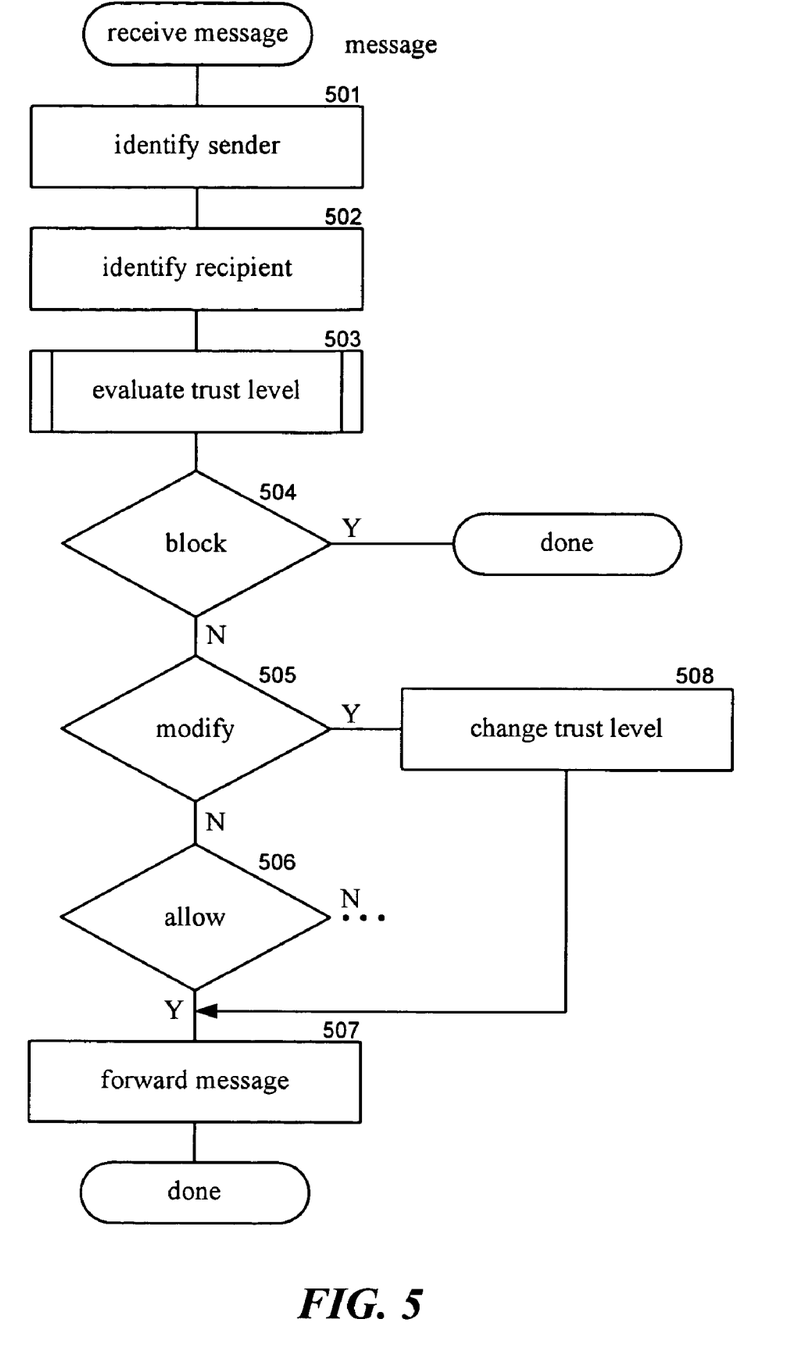
FIG. 5 is a flow diagram that illustrates the processing of the receive electronic message component of an access point of a receiving domain in one embodiment.

FIG. 5 is a flow diagram that illustrates the processing of the receive electronic message component of an access point of a receiving domain in one embodiment. The component is invoked when a receiving domain receives a message and wants to determine whether to discard or forward the message. In block 501, the component identifies the sender of the message. In block 502, the component identifies the recipient of the message. In block 503, the component invokes the evaluate trust level component to determine how to handle the message. The invoked component may return an indication whether to block, allow, or take some other action with the received message. In decision block 504, if the invoked component indicates to block the received message, then the component discards the message and completes, else the component continues at block 505. In decision block 505, if the invoked component indicates to modify the trust level, the component continues at block 508, else the component continues at block 506. In decision block 506, if the invoked component indicates to allow the received message, then the component continues at block 507, else the component may take some other action. In block 508, the component changes the trust level associated with the received message and then continues at block 507. In block 507, the component forwards the message with the trust level to the recipient and then completes. The client computer system of the recipient may perform a similar analysis in deciding how to handle the received message. For example, the client computer system may block all electronic communications received from certain sending domains.

Figure 6:
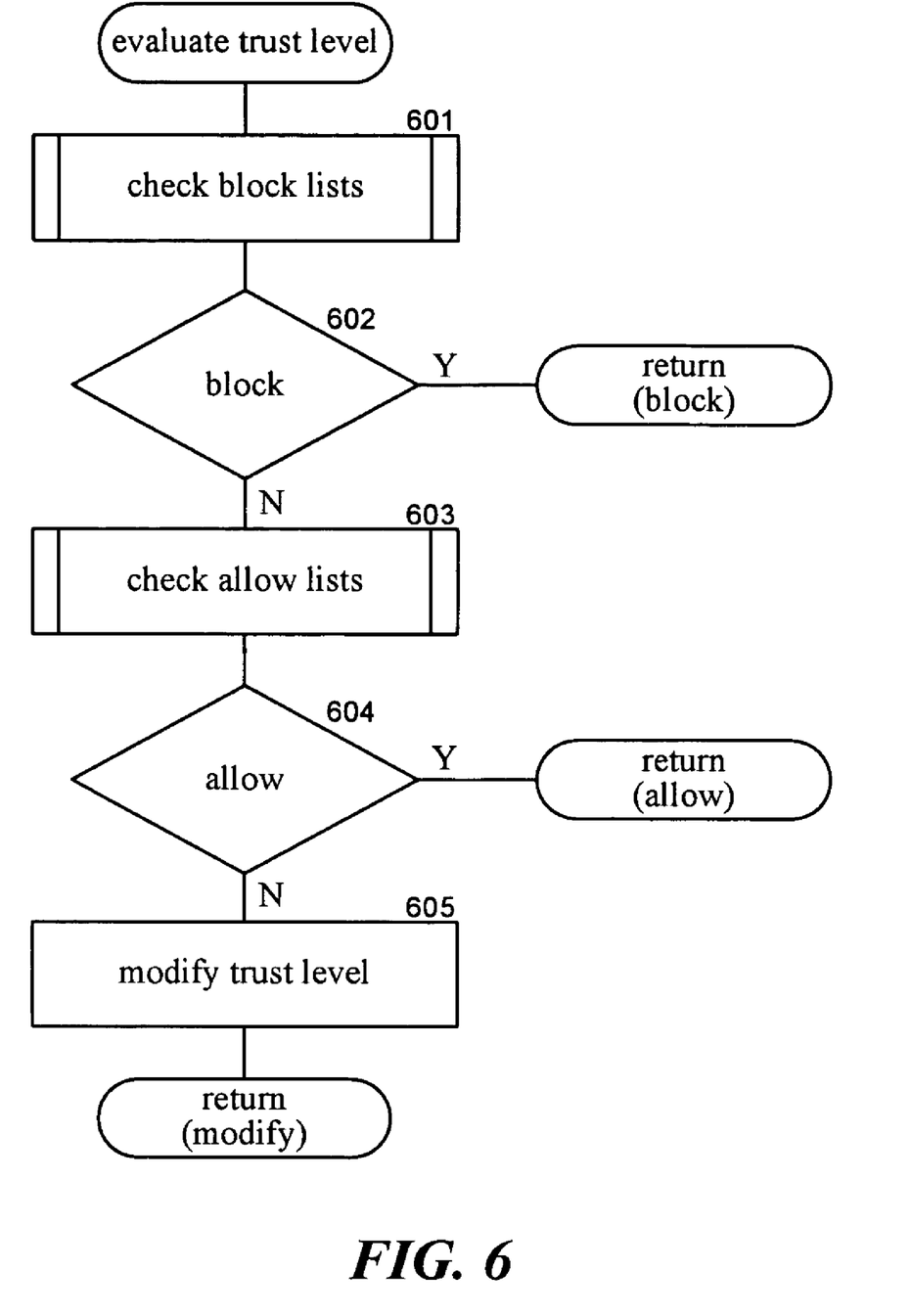
FIG. 6 is a flow diagram that illustrates the processing of an evaluate trust level component of an access point of a receiving domain in one embodiment.

FIG. 6 is a flow diagram that illustrates the processing of an evaluate trust level component of an access point of a receiving domain in one embodiment. The component may check various block and allow lists to determine how to handle the received message. In block 601, the component determines whether the sending domain is on various block lists of the receiving domain. In decision block 602, if the sending domain is on a block list, then the component returns an indication that the received message should be blocked, else the component continues at block 603. In block 603, the component determines whether the sending domain is on an allow list of the receiving domain. In decision block 604, if the sending domain is on an allow list, then the component returns an indication that the message is allowed, else the component continues at block 605. In block 605, the component may modify the trust level and return an indication of the modified trust level.

Figure 7:
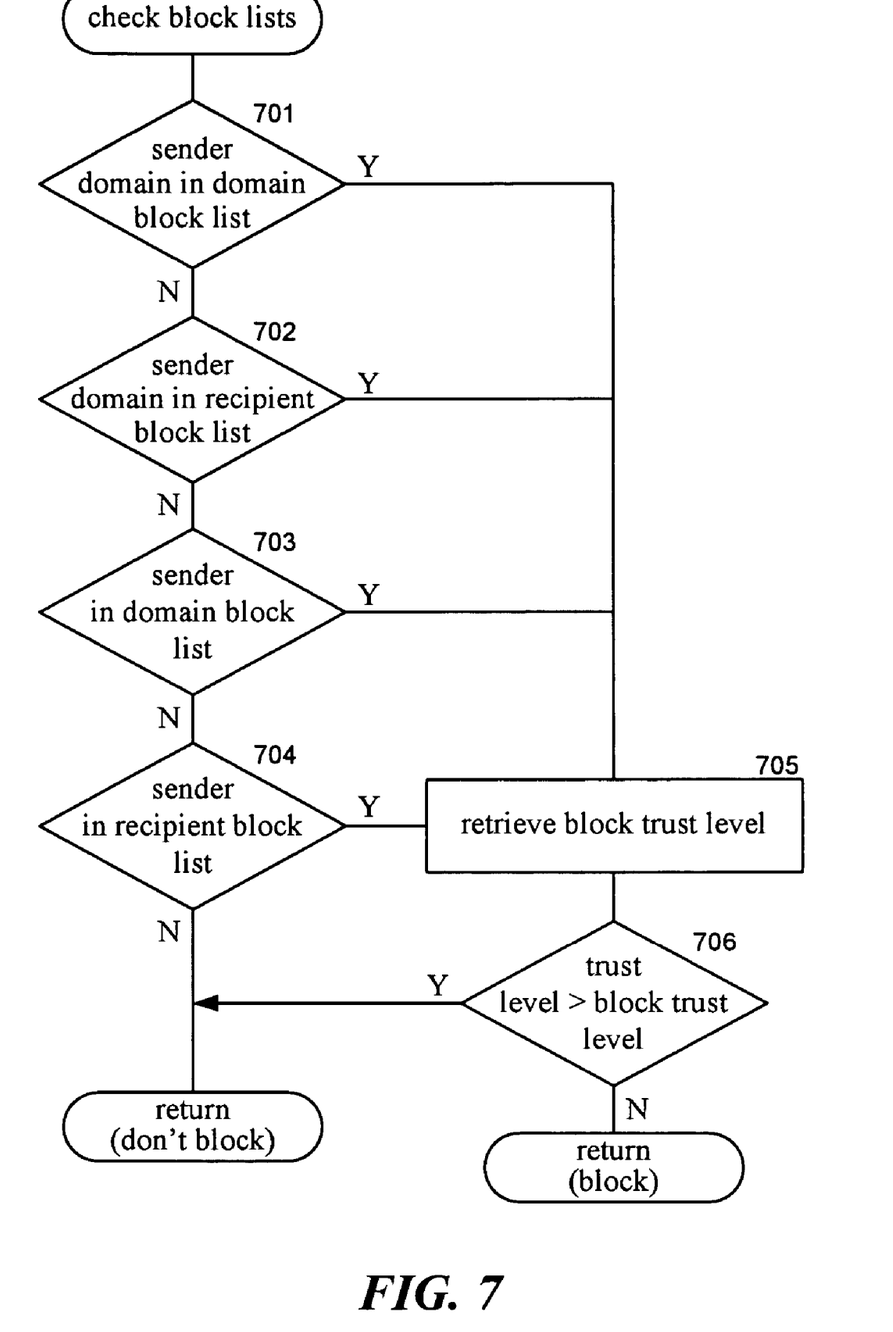
FIG. 7 is a flow diagram that illustrates the processing of a check block list component of an access point of a receiving domain in one embodiment.

FIG. 7 is a flow diagram that illustrates the processing of a check block list component of an access point of a receiving domain in one embodiment. The receiving domain may maintain various block lists that are global to the domain or specific to a recipient within the domain. In addition, the receiving domain may maintain block lists for sending domains and for individual senders. In decision block 701, if the sending domain is in a domain block list, then the component continues at block 705, else the component continues at block 702. In decision block 702, if the sending domain is in the recipient's block list, then the component continues at block 705, else the component continues at block 703. In decision block 703, if the sender is in a domain block list, then the component continues at block 705, else the component continues at block 704. In decision block 704, if the sender is in the recipient's block list, then the component continues at block 705, else the component returns an indication that the received message is not blocked. In block 705, the component retrieves a block trust level associated with the block list. In decision block 706, if the trust level of the message is greater than the block trust level, then the component returns an indication that the received message is not blocked, else the component returns an indication that the received message is blocked. One skilled in the art will appreciate that a recipient-specific block list may be maintained and enforced at the client computer system of the recipient.

One skilled in the art will appreciate that although specific embodiments of the trust system have been described herein for purposes of illustration, various modifications may be made without deviating from the spirit and scope of the invention. The trust system may be used in conjunction with various technologies that help authenticate the sending domain. As is well known, senders of electronic communications often attempt to mislead the recipient into believing the electronic communication is from another legitimate domain. To mislead the recipient, the sender "spoofs" the identity of the legitimate domain by replacing the identity of their domain in the electronic communication with the identity of the legitimate domain. Such spoofing can be detected by comparing the Internet protocol ("IP") addresses registered by the legitimate domain to the IP address of the sender as indicated by the electronic communication. If the sender's IP address does not match a registered IP address, then the receiving domain may assume that the legitimate domain has been spoofed and may discard the electronic communication. Techniques for authenticating the sending domain of an electronic communication are described in U.S. patent application Ser. No. 10/856,259, entitled "Secure Federation of Data Communications Networks" and filed on May 27, 2004, which is hereby incorporated by reference. Accordingly, the invention is not limited except by the appended claims.

We claim:

1. A method performed by an access point of a receiving domain for processing a communication sent from a sender in a sending domain to a recipient in the receiving domain, the sending domain being different from the receiving domain, the method comprising:

receiving from an access point of the sending domain the communication sent from the sender to the recipient in the receiving domain via the access point of the sending domain;

receiving from the access point of the sending domain along with the received communication a trust level associated with the sender, the trust level indicating confidence that the sending domain has that the communication will be wanted by the recipient of the communication;

determining a confidence that the receiving domain has that the trust levels received from the sending domain accurately reflect whether senders in the sending domain are sending wanted communications;

determining whether a trust criterion is satisfied based on the received communication and the received trust level, the trust criterion factoring in the determined confidence that the receiving domain has in the sending domain; and processing the received communication based on whether the trust criterion is satisfied such that the communication is sent from the access point of the receiving domain to the recipient when the determined trust criterion is satisfied.

2. The method of claim 1 including modifying the received trust level based on the determined confidence that the receiving domain has in the sending domain and wherein the trust criterion is satisfied when the modified trust level exceeds a threshold trust level.

3. The method of claim 1 wherein the trust criterion is not satisfied when the sending domain is a blocked domain.

4. The method of claim 3 wherein when the trust criterion is not satisfied, not sending the received communication to the recipient.

5. The method of claim 1 wherein the trust criterion is satisfied when the sending domain is an allowed domain.

6. The method of claim 5 wherein when the trust criterion is satisfied, sending the received communication and the received trust level to the recipient.

7. The method of claim 1 wherein when the trust criterion is satisfied, modifying the received trust level and sending the received communication and the modified trust level to the recipient.

8. The method of claim 1 wherein when the trust criterion is satisfied, the processing includes forwarding the trust level for display to the recipient.

9. The method of claim 8 wherein when the recipient selects to receive the communication after viewing the trust level, the processing includes forwarding the communication to the recipient.

10. A computer-readable storage medium containing instructions for controlling a computer system implementing an access point of a receiving domain to process a communication sent from a sender in a sending domain to a recipient in the receiving domain, the sending and receiving domains being different domains, by a method comprising:

receiving from an access point of the sending domain a message that includes the communication sent from the sender in the sending domain to the recipient in the receiving domain, and that includes a trust level associated with the sender, the trust level indicating confidence that the sending domain has that the communication will be wanted by the recipient of the communication;

determining whether a trust criterion is satisfied based on the received message and a confidence that the receiving domain has that the trust levels received from the sending domain accurately reflect whether senders in the sending domain are sending wanted communications; and processing the received communication based on whether the trust criterion is satisfied, the processing including notifying the sending domain when the trust criterion is determined not to be satisfied.

11. The computer-readable storage medium of claim 10 wherein the trust criterion is satisfied when the received trust level exceeds a trust level.

12. The computer-readable storage medium of claim 10 wherein when the trust criterion is not satisfied, the processing includes sending the received communication to the recipient along with a modified trust level.

13. The computer-readable storage medium of claim 10 wherein the trust criterion is not satisfied when the sending domain is a blocked domain.

14. The computer-readable storage medium of claim wherein the trust criterion is satisfied when the sending domain is an allowed domain.

15. The computer-readable storage medium of claim 10 wherein when the trust criterion is satisfied, modifying the received trust level and sending the received communication and the modified trust level to the recipient.

16. The computer-readable storage medium of claim 10 wherein when the trust criterion is satisfied, the processing includes forwarding the trust level for display to the recipient.

17. The computer-readable storage medium of claim 16 wherein when the recipient selects to recieve the communication after viewing the trust level, the processing includes forwarding the communication to the recipient.

18. A computer system for processing a communication sent from a sender in a sending domain to a recipient in a receiving domain that is different from the sending domain, comprising:

a component that receives from the sending domain the communication sent from the sender in the sending domain;

a component that receives from the sending domain a trust level associated with the sender, the trust level indicating confidence that the sending domain has that the communication will be wanted by the recipient of the communication;

a component that determines whether a trust criterion is satisfied based on analysis of the received communication, the received trust level, and confidence that the receiving domain has that trust levels received from the sending domain accurately reflect whether senders in the sending domain are sending wanted communications; and a component that processes that received communication based on whether the trust criterion is satisfied.

* * * * *